US008654067B2

(12) United States Patent
Lee

(10) Patent No.: US 8,654,067 B2
(45) Date of Patent: Feb. 18, 2014

(54) APPARATUS AND METHOD FOR DRIVING BACKLIGHT OF LIQUID CRYSTAL DISPLAY APPARATUS

(75) Inventor: Tae Wook Lee, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 528 days.

(21) Appl. No.: 13/036,328

(22) Filed: Feb. 28, 2011

(65) Prior Publication Data

US 2011/0148950 A1 Jun. 23, 2011

Related U.S. Application Data

(62) Division of application No. 11/602,317, filed on Nov. 21, 2006, now Pat. No. 7,911,440.

(30) Foreign Application Priority Data

Apr. 13, 2006 (KR) ........................ 10-2006-0033604
Nov. 6, 2006 (KR) ........................ 10-2006-0108859

(51) Int. Cl.
*G09G 3/36* (2006.01)

(52) U.S. Cl.
USPC ........................................... 345/102; 345/211

(58) Field of Classification Search
USPC ................................................. 345/102, 211
See application file for complete search history.

(56) References Cited

U.S. PATENT DOCUMENTS 3,571,692 A * 3/1971 Andren ........................... 363/16
4,174,534 A * 11/1979 Kotlarewsky .................. 363/26
5,369,564 A * 11/1994 Choi .............................. 363/71
6,262,901 B1 * 7/2001 Simopoulos .................... 363/72
6,420,839 B1 7/2002 Chiang et al.
6,954,364 B2 10/2005 Min
7,205,752 B2 * 4/2007 Jansen ......................... 323/272
7,218,059 B2 5/2007 Li et al.
7,282,866 B2 10/2007 Nakanishi
7,619,371 B2 11/2009 Chen
2007/0132406 A1 * 6/2007 Komatsu et al. .............. 315/312

OTHER PUBLICATIONS

Abstract for CN 1575084 A, published Feb. 2, 2005.

* cited by examiner

*Primary Examiner* — William Boddie
*Assistant Examiner* — Andrew Schnirel
(74) *Attorney, Agent, or Firm* — McKenna Long & Aldridge LLP

(57) ABSTRACT

A backlight driving apparatus of a liquid crystal display (LCD) apparatus including a master trans and a slave trans for supplying a current to a plurality of lamps, and a master driver and a slave driver for driving the lamps, includes an operated condition unit that converts an AC voltage generated in accordance with a phase difference between a master AC voltage and a slave AC voltage fed back from the master trans and the slave trans, respectively, into an analog DC voltage; a protect controller that determines an error is generated during an operation of the lamps using the analog DC voltage and outputs an operating error signal when an error is generated; and a lamp driving controller that stops driving the master driver and the slave driver in response to the operating error signal.

12 Claims, 15 Drawing Sheets

300
301 LAMP DRIVING CONTROLLER
302 MASTER DRIVER
303 SLAVE DRIVER
205 MASTER DC/AC SWITCHING PORTION
206 SLAVE DC/AC SWITCHING PORTION
207
208
201
304 FIRST MASTER VOLTAGE SPLITTER
306 FIRST SLAVE VOLTAGE SPLITTER
305 SECOND MASTER VOLTAGE SPLITTER
307 SECOND SLAVE VOLTAGE SPLITTER
308 OPERATED CONDITION DETECTOR
309 MASTER AC/DC CONVERTER
310 SLAVE AC/DC CONVERTER
311 PROTECTIVE CONTROLLER 400
201
207
208
MASTER DC/AC SWITCHING PORTION
205
SLAVE DC/AC SWITCHING PORTION
206
MASTER DRIVER
302
SLAVE DRIVER
303
MAIN CONTROLLER
410
FIRST MASTER VOLTAGE SPLITTER
304
FIRST SLAVE VOLTAGE SPLITTER
306
OPERATED CONDITION DETECTOR
308
SECOND MASTER VOLTAGE SPLITTER
305
SECOND SLAVE VOLTAGE SPLITTER
307
MASTER AC/DC CONVERTER
309
SLAVE AC/DC CONVERTER
310

308
OPERATED CONDITION DETECTOR
309
MASTER AC/DC CONVERTER
310
SLAVE AC/DC CONVERTER
520
Vref
523
521
A/D CONVERTER
522
ERROR SENSOR
PROTECTIVE CONTROLLER
302
MASTER DRIVER
303
SLAVE DRIVER
510
LAMP DRIVING CONTROLLER 600
201
207
208
MASTER DC/AC SWITCHING PORTION
205
SLAVE DC/AC SWITCHING PORTION
206
FEEDBACK PORTION
620
PROTECTIVE CONTROLLER
630
MASTER DRIVER
302
SLAVE DRIVER
303
LAMP DRIVING CONTROLLER
610

700
710
LAMP DRIVING CONTROLLER
302
MASTER DRIVER
303
SLAVE DRIVER
205
MASTER DC/AC SWITCHING PORTION
206
SLAVE DC/AC SWITCHING PORTION
207
208
201
FEEDBACK PORTION
720
PROTECTIVE CONTROLLER
730

APPARATUS AND METHOD FOR DRIVING BACKLIGHT OF LIQUID CRYSTAL DISPLAY APPARATUS

This application is a divisional of U.S. patent application Ser. No. 11/602,317, filed Nov. 21, 2006, now U.S. Pat No. 7,911,440, which claims the benefit of Korean Patent Application No. P2006-0033604, filed on Apr. 3, 2006 and Korean Patent Application No. P2006-0108859, filed on Nov. 06, 2006, all of which are hereby incorporated by reference for all purposes as if fully set forth herein.

BACKGROUND OF THE INVENTION

1. Field of the Invention

The present invention relates to a liquid crystal display (LCD) apparatus, and more particularly to a backlight driving apparatus of an LCD apparatus and method for driving the same that are adaptive for automatically shielding a voltage supply upon generation of an error during an operation of lamps.

2. Discussion of the Related Art

Generally, liquid crystal display (LCD) apparatus control the light transmittance of liquid crystal cells in accordance with video signals to display images. Active matrix type LCD apparatus are advantageous for implementation of moving images because a switching device actively controls each liquid crystal cell. A thin film transistor (hereinafter, referred to as "TFT") is mainly employed for the switching device in active matrix type LCD apparatus.

FIG. 1 is an equivalent circuit diagram of a pixel of an LCD apparatus according to the related art.

Referring to FIG. 1, the LCD converts a digital input data into an analog data voltage on the basis of a gamma reference voltage to supply it to a data line DL and, at the same time, supplies a scanning pulse to a gate line GL to thereby charge a liquid crystal cell Clc.

A gate electrode of the TFT is connected to the gate line GL while a source electrode thereof is connected to the data line DL. Further, a drain electrode of the TFT is connected to a pixel electrode of the liquid crystal cell Clc and to one electrode of a storage capacitor Cst.

A common electrode of the liquid crystal cell Clc is supplied with a common voltage Vcom. The storage capacitor Cst stores a data voltage fed from the data line DL when the TFT is turned on to maintain the data voltage for the liquid crystal cell Clc.

When the scanning pulse is applied to the gate line GL, the TFT is turned on to provide a channel between the source electrode and the drain electrode thereof, thereby supplying a data voltage on the data line DL to the pixel electrode of the liquid crystal cell Clc. The alignment of the liquid crystal molecules of the liquid crystal cell changes in accordance with an electric field generated between the pixel electrode and the common electrode and light incident to the LCD apparatus can thus be modulated to display images.

A configuration of an LCD apparatus according to the related art will now be described. FIG. 2 is a block diagram illustrating a configuration of an LCD apparatus according to the related art.

Referring to FIG. 2, the LCD apparatus 100 includes an LCD panel 110 provided with a thin film transistor (TFT) located adjacent to each crossing of data lines DL1 to DLm and gate lines GL1 to GLn for each liquid crystal cell Clc, a data driver 120 for supplying data voltages to the data lines DL1 to DLm, a gate driver 130 for supplying scanning pulses to the gate lines GL1 to GLn, a gamma reference voltage generator 140 for generating gamma reference voltages and supplying them to the data driver 120, a backlight assembly 150 for irradiating light onto the LCD panel 110, an inverter 160 for applying AC voltages and currents to the backlight assembly 150, a common voltage generator 170 for generating a common voltage Vcom and supplying it to the common electrode of the liquid crystal cell Clc, a gate driving voltage generator 180 for generating a gate high voltage VGH and a gate low voltage VGL and supplying them to the gate driver 130, and a timing controller 190 for controlling the data driver 120 and the gate driver 130.

The LCD panel 110 has a liquid crystal between two glass substrates. On the lower glass substrate of the LCD panel 110, the data lines DL1 to DLm and the gate lines GL1 to GLn perpendicularly cross each other. The TFTs are provided adjacent to crossings of the data lines DL1 to DLm and the gate lines GL1 to GLn. The TFTs supply data voltages from the data lines DL1 to DLm to the liquid crystal cells Clc in response to the scanning pulses. The gate electrodes of the TFTs are connected to the gate lines GL1 to GLn while the source electrodes thereof are connected to the data lines DL1 to DLm. Further, the drain electrodes of the TFTs are connected to the pixel electrodes of the liquid crystal cells Clc and to the storage capacitors Cst.

The TFTs are turned on in response to the scanning pulses applied to the gate terminal thereof via the gate lines GL1 to GLn. Upon turning-on of the TFTs, data voltages on the data lines DL1 to DLm are supplied to the pixel electrodes of the liquid crystal cells Clc.

The data driver 120 supplies data voltages to the data lines DL1 to DLm in response to a data driving control signal DDC from the timing controller 190. Further, the data driver 120 samples and latches digital video data RGB fed from the timing controller 190, converts them into analog data voltages capable of expressing gray scale levels at the liquid crystal cells Clc on the basis of gamma reference voltages generated from the gamma reference voltage generator 140, and then supplies them to the data lines DL1 to DLm.

The gate driver 130 sequentially generates scanning pulses (gate pulses) in response to a gate driving control signal GDC and a gate shift clock GSC from the timing controller 190 and supplies them to the gate lines GL1 to GLn. The gate driver 130 determines a high-level voltage and a low-level voltage of the scanning pulses in accordance with the gate high voltage VGH and the gate low voltage VGL from the gate driving voltage generator 180.

The gamma reference voltage generator 140 receives a highest-level power voltage VDD to generate positive and negative gamma reference voltages and outputs them to the data driver 120.

The backlight assembly 150 is provided at the rear side of the LCD panel 110 and radiates light toward the LCD panel 110 by alternating current AC voltages and currents supplied from the inverter 160.

The inverter 160 converts a rectangular wave signal generated at the interior thereof into a triangular wave signal, compares the triangular wave signal with a direct current DC power voltage VCC supplied from the LCD apparatus, and then generates a burst dimming signal based on the result of the comparison. In response to the burst dimming signal, a driving integrated circuit IC (not shown) in the inverter 160 controls the AC voltages and currents supplied to the backlight assembly 150.

The common voltage generator 170 receives a high-level power voltage VDD to generate a common voltage Vcom, and supplies it to the common electrode of the liquid crystal cell Clc provided at each pixel of the LCD panel 110.

The gate driving voltage generator 180 is supplied with a high-level power voltage VDD to generate the gate high voltage VGH and the gate low voltage VGL, and supplies them to the data driver 130. Herein, the gate high voltage VGH is greater than the threshold voltage of the TFT provided at each pixel of the LCD panel 110 and the gate low voltage VGL is less then the threshold voltage of the TFT. The gate high voltage VGH and the gate low voltage VGL generated in this manner are used for determining a high-level voltage and a low-level voltage of the scanning pulses generated by the gate driver 130, respectively.

The timing controller 190 supplies digital video data RGB from a digital video card (not shown) to the data driver 120 and, at the same time, generates a data driving control signal DCC and a gate driving control signal GDC using horizontal/vertical synchronizing signals H and V in response to a clock signal CLK to supply them to the data driver 120 and the gate driver 130, respectively. Herein, the data driving control signal DDC includes a source shift clock SSC, a source start pulse SSP, a polarity control signal POL and a source output enable signal SOE, etc. The gate driving control signal GDC includes a gate start pulse GSP and a gate output enable signal GOE, etc.

A configuration of the related art backlight driving apparatus included in a backlight assembly of an LCD apparatus having the above-mentioned configuration will now be described.

FIG. 3 is a block diagram illustrating a configuration of a backlight driving apparatus of an LCD apparatus according to the related art.

Referring to FIG. 3, the backlight driving apparatus 200 includes a lamp driving controller 202, a master driver 203, a slave driver 204, a master AC/DC switching portion 205, a slave AC/DC switching portion 206, a master trans 207 and a slave trans 208.

The lamp driving controller 202 generates a push-pull gate signal for controlling a plurality of lamps 201 in accordance with the burst dimming signal.

The master driver 203 and the slave driver 204 generate a pull-bridge gate signal for the plurality of lamps 201 in response to the push-pull gate signal.

The master DC/AC switching portion 205 switches converts a DC high-level voltage DC 400V inputted from the master driver 203 in accordance with the pull-bridge gate signal to an AC voltage 400 Vrms, and supplies a positive AC voltage 400 Vrms and a negative AC voltage 400 Vrms to the master trans 207 via each two signal lines.

The slave DC/AC switching portion 206 converts a DC high-level voltage DC 400V inputted from the slave driver 204 in accordance with the pull-bridge gate signal to an AC voltage 400 Vrms, and supplies a positive AC voltage 400 Vrms and a negative AC voltage 400 Vrms to the slave trans 208 via each two signal paths. The master DC/AC switching portion 205 and the slave DC/AC switching portion 206 output the AC voltages 400 Vrms having the same phase.

The master trans 207 boosts the AC voltage 400 Vrms inputted, via two signal lines, from the master DC/AC switching portion 205 to an AC voltage 750 Vrms and supplies it to an edge of the plurality of lamps 201. The slave trans 208 boosts the AC voltage 400 Vrms inputted, via two signal lines, from the slave DC/AC switching portion 206 to an AC voltage 750 Vrms and supplies it to the other edge of the plurality of lamps 201. The AC voltage 750 Vrms outputted from the slave trans 206 has an adverse phase to the AC voltage 750 Vrms outputted from the master trans 207.

Thus, the AC voltages 750 Vrms having adverse phases are supplied to the both edges of the plurality of lamps 201. As a result, the AC voltage 1500 Vrms is substantially supplied to the plurality of lamps 201. The magnitude of the AC voltage supplied to the lamps 201 may change depending upon the type and number of the lamps.

As described above, the related art backlight driving apparatus does not have an error detection function so that an inspector or customer may be subject to an electrical shock.

SUMMARY OF THE INVENTION

Accordingly, the present invention is directed to a backlight driving apparatus of an LCD apparatus and method for driving the same that substantially obviates one or more problems due to limitations and disadvantages of the related art.

An advantage of the present invention is to provide a backlight driving apparatus and method for driving the same that are adaptive for automatically shielding a voltage supply upon generating of an error during an operation of lamps.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight driving apparatus of a liquid crystal display (LCD) apparatus including a master trans and a slave trans for supplying a current to a plurality of lamps, and a master driver and a slave driver for driving the lamps, includes an operated condition unit that converts an AC voltage generated in accordance with a phase difference between a master AC voltage and a slave AC voltage fed back from the master trans and the slave trans, respectively, into an analog DC voltage; a protect controller that determines an error is generated during an operation of the lamps using the analog DC voltage and outputs an operating error signal when an error is generated; and a lamp driving controller that stops driving the master driver and the slave driver in response to the operating error signal.

The invention, in a method of driving a backlight driving apparatus of the LCD apparatus including a master trans and a slave trans for supplying a current to a plurality of lamps, and a master driver and a slave driver for driving the lamps, comprises the steps of converting a AC voltage generated by a phase difference of a master AC voltage and a slave AC voltage fed back from the master trans and the slave trans into an analog DC voltage; judging a generation of an error of the lamps operated by using the analog DC voltage to generate an operating error signal and the enable signal in accordance with the result; and stopping a drive of the master driver and the slave driver in response to an operating error signal from the protective controller or for normally driving the master driver and the slave driver in response to the enable signal of the protective controller. Herein, the present invention further includes the steps of converting a master AC voltage fed back from the master trans into a master DC voltage and converting a slave AC voltage fed back from the slave trans into a slave DC voltage; judging an initial error generation of the lamps using the fed back master DC voltage and the slave DC voltage at an initial driving condition and generating an initial error signal and the enable signal in accordance with the result; and stopping an initial drive of the master driver and the slave driver in response to the initial error signal.

The present invention, in a backlight driving apparatus of the LCD apparatus including a master trans and a slave trans for supplying a current to a plurality of lamps, and a master driver and a slave driver for driving the lamps, comprises a voltage feedback means for converting a master AC voltage fed back from the master trans into a master DC voltage and for converting a slave AC voltage fed back from the slave trans into a slave DC voltage; a protective controller for judging an initial error generation of the lamps using the fed back master DC voltage and the slave DC voltage at an initial driving condition to generate an initial error signal and the enable signal in accordance with the result; and a lamp driving controller for stopping an initial drive of the master driver and the slave driver in response to an initial error signal from the protective controller or for normally driving the master driver and the slave driver in response to the enable signal from the protective controller.

The present invention, in a method of driving a backlight driving apparatus of the LCD apparatus including a master trans and a slave trans for supplying a current to a plurality of lamps, and a master driver and a slave driver for driving the lamps, comprises the steps of converting a master AC voltage fed back from the master trans into a master DC voltage and converting a slave AC voltage fed back from the slave trans into a slave DC voltage; judging an initial error generation of the lamps using the fed back master DC voltage and the slave DC voltage at an initial driving condition and generating an initial error signal and the enable signal in accordance with the result; and stopping an initial drive of the master driver and the slave driver in response to the initial error signal from the protective controller or for normally driving the master driver and the slave driver in response to the enable signal from the protective controller.

The present invention, in a backlight driving apparatus of the LCD apparatus including a master trans and a slave trans for supplying a current to a plurality of lamps, and a master driver and a slave driver for driving the lamps, comprises an operating condition detect means for converting a AC voltage generated by a phase difference of a master AC voltage and a slave AC voltage fed back from the master trans and the slave trans into an analog DC voltage; and a main control means for judging a generation of an error of the lamps operated by using the analog DC voltage to stop a drive of the master driver and the slave driver or to normally drive the master driver and the slave driver in accordance with the result. Herein, the present invention further includes a voltage feedback means for converting a master AC voltage fed back from the master trans into a master DC voltage and for converting a slave AC voltage fed back from the slave trans into a slave DC voltage to output it to the protective controller.

The present invention, in a method of driving a backlight driving apparatus of the LCD apparatus including a master trans and a slave trans for supplying a current to a plurality of lamps, and a master driver and a slave driver for driving the lamps, comprises the steps of converting a AC voltage generated by a phase difference of a master AC voltage and a slave AC voltage fed back from the master trans and the slave trans into an analog DC voltage; and judging a generation of an error of the lamps operated by using the analog DC voltage to stop a drive of the master driver and the slave driver or to normally drive the master driver and the slave driver in accordance with the result.

The present invention, in a backlight driving apparatus of the LCD apparatus including a master trans and a slave trans for supplying a current to a plurality of lamps, and a master driver and a slave driver for driving the lamps, comprises a voltage feedback means for converting a master AC voltage fed back from the master trans into a master DC voltage and for converting a slave AC voltage fed back from the slave trans into a slave DC voltage; and a main control means for judging an initial error generation of the lamps using the fed back master DC voltage and the slave DC voltage at an initial driving condition to stop an initial drive of the master driver and the slave driver or to normally drive the master driver and the slave driver in accordance with the result.

The present invention, in a method of driving a backlight driving apparatus of the LCD apparatus including a master trans and a slave trans for supplying a current to a plurality of lamps, and a master driver and a slave driver for driving the lamps, comprises the steps of converting a master AC voltage fed back from the master trans into a master DC voltage and for converting a slave AC voltage fed back from the slave trans into a slave DC voltage; and judging an initial error generation of the lamps using the fed back master DC voltage and the slave DC voltage at an initial driving condition to stop an initial drive of the master driver and the slave driver or to normally drive the master driver and the slave driver in accordance with the result.

The present invention, in a backlight driving apparatus of the LCD apparatus including a master trans and a slave trans for supplying a current to a plurality of lamps, and a master driver and a slave driver for driving the lamps, comprises an operating condition detect means for converting a AC voltage generated by a phase difference of a master AC voltage and a slave AC voltage fed back from the master trans and the slave trans into an analog DC voltage: a protective controller for judging an error generation of the operating lamps using the analog DC voltage to stop a drive of the master driver and the slave driver or to normally drive the master driver and the slave driver in accordance with the result; and a lamp driving controller for controlling an output of the master driver and the slave driver in accordance with the inputted burst dimming signal. Herein, the present invention further includes a voltage feedback means for converting a master AC voltage fed back from the master trans into a master DC voltage and for converting a slave AC voltage fed back from the slave trans into a slave DC voltage to output it to the protective controller.

The present invention, in a method of driving a backlight driving apparatus of the LCD apparatus including a master trans and a slave trans for supplying a current to a plurality of lamps, and a master driver and a slave driver for driving the lamps, comprises the steps of converting a AC voltage generated by a phase difference of a master AC voltage and a slave AC voltage fed back from the master trans and the slave trans into an analog DC voltage; and judging a generation of an error of the operating lamps using the analog DC voltage to supply a disable signal to the master driver and the slave driver or to supply the enable signal to the master driver and the slave driver in accordance with the result. Herein, the present invention further includes the steps of converting a master AC voltage fed back from the master trans into a master DC voltage and converting a slave AC voltage fed back from the slave trans into a slave DC voltage; judging an initial error generation of the lamps using the fed back master DC voltage and the slave DC voltage at an initial driving condition to generate an initial error signal and an initial normal signal in accordance with the result; and stopping an initial drive of the master driver and the slave driver in response to the initial error signal.

The present invention, in a backlight driving apparatus of the LCD apparatus including a master trans and a slave trans for supplying a current to a plurality of lamps, and a master driver and a slave driver for driving the lamps, comprises an operating condition detect means for converting a AC voltage generated by a phase difference of a master AC voltage and a slave AC voltage fed back from the master trans and the slave trans into an analog DC voltage; and a main control means for controlling an output of the master driver and the slave driver in response to the inputted burst dimming signal, and for judging an error generation of the operating lamps using the analog DC voltage to stop a drive of the master driver and the slave driver or to normally drive the master driver and the slave driver in accordance with the result. Herein, the present invention further includes a voltage feedback means for converting a master AC voltage fed back from the master trans into a master DC voltage and for converting a slave AC voltage fed back from the slave trans into a slave DC voltage to output it to the main control means.

The present invention, in a backlight driving apparatus of the LCD apparatus including a master trans and a slave trans for supplying a current to a plurality of lamps and a master driver and a slave driver for driving the lamps, comprises a feedback portion for feeding back a master AC voltage outputted from the master trans and a slave AC voltage outputted from the slave trans; and a protective controller for judging an error generation using a master AC voltage and a slave AC voltage fed back by the feedback portion to stop a drive of the master driver and the slave driver upon generation of an error.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to embodiments of the present invention, examples of which are illustrated in the accompanying drawings. The same reference numbers may be used throughout the drawings to refer to the same or like parts.

Figure 1:
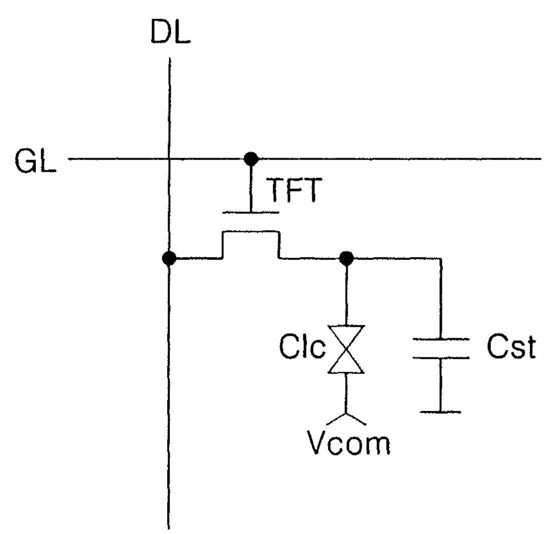
FIG. 1 is an equivalent circuit diagram of a pixel of an LCD apparatus according to the related art.
Figure 2:
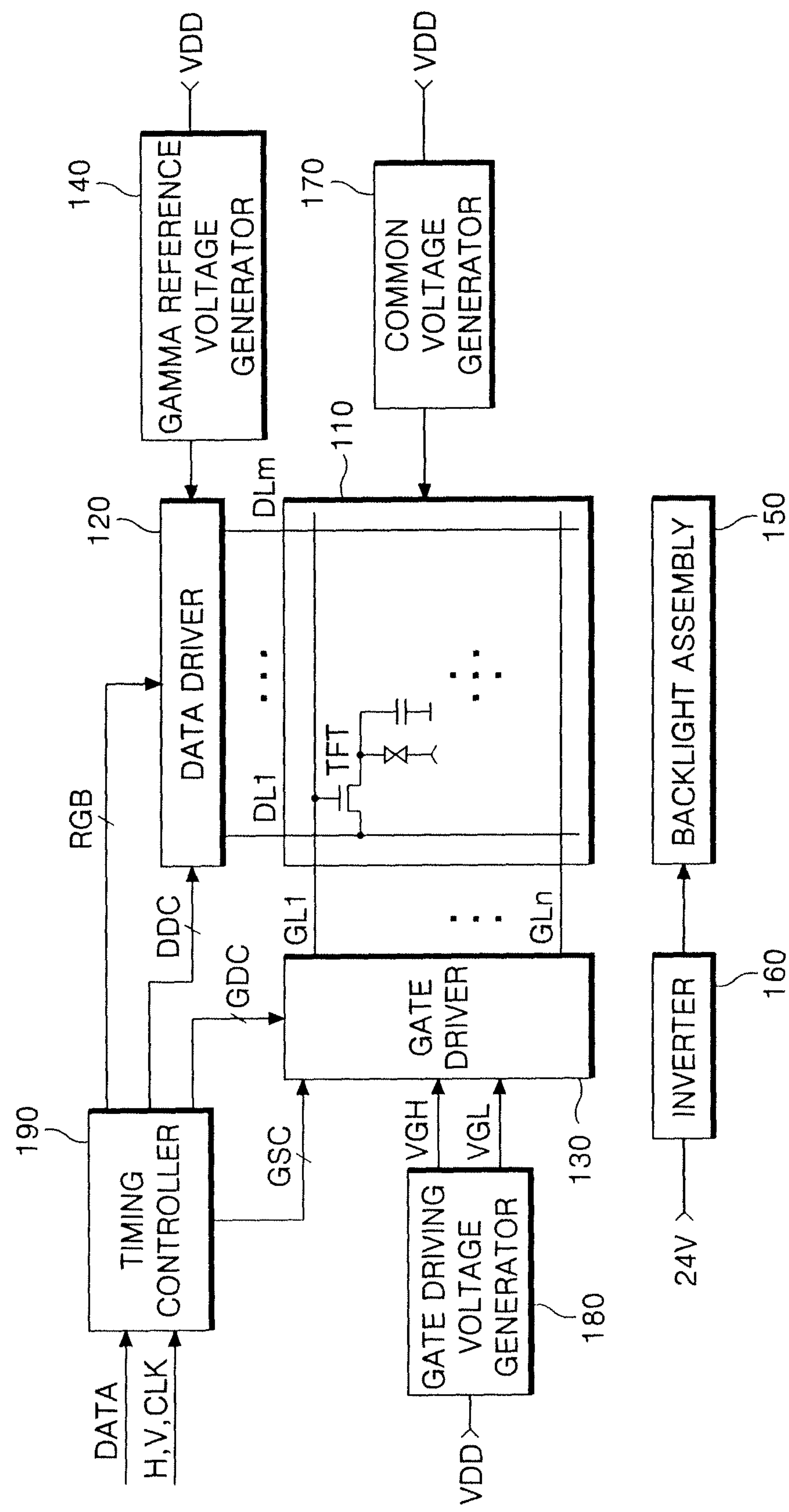
FIG. 2 is a block diagram illustrating a configuration of an LCD apparatus according to the related art.
Figure 3:
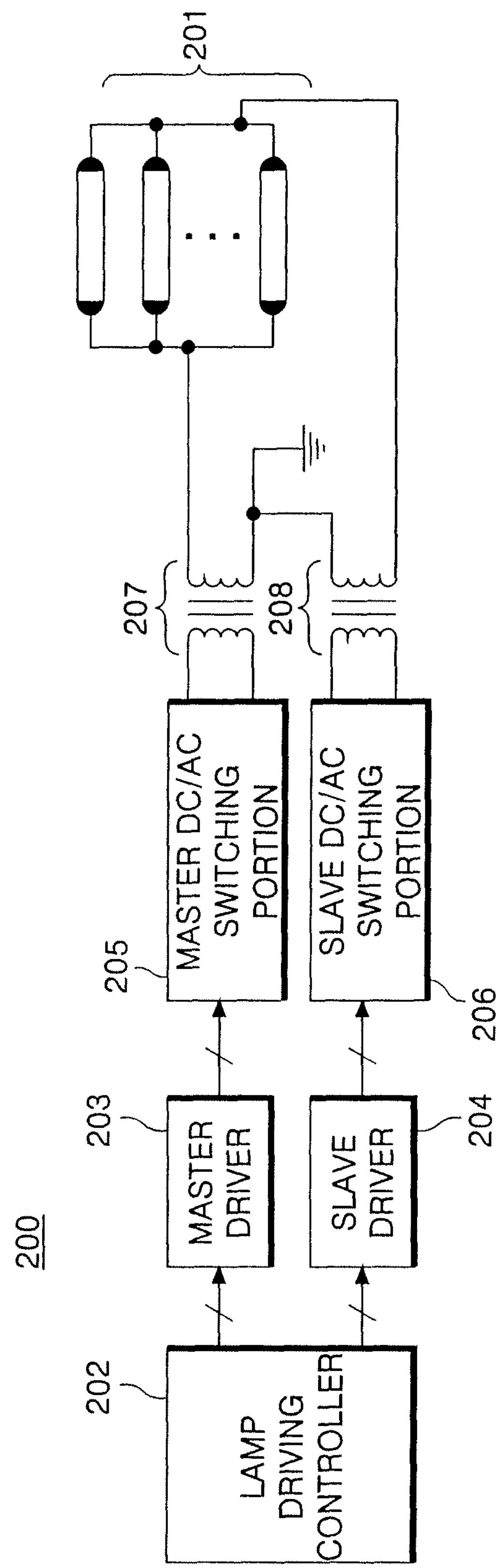
FIG. 3 is a block diagram illustrating a configuration of a backlight driving apparatus of an LCD apparatus according to the related art.
Figure 4:
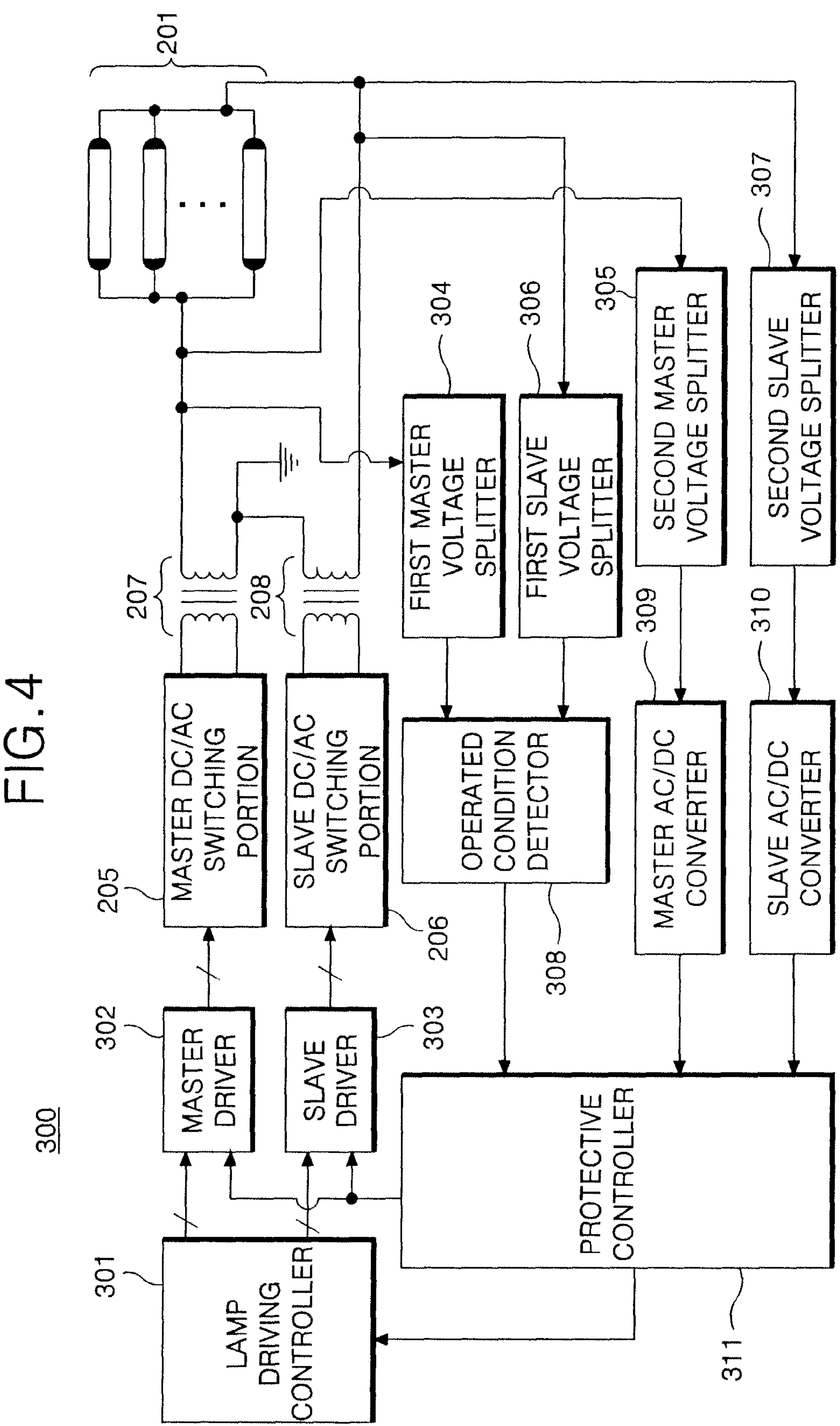
FIG. 4 is a block diagram illustrating a configuration of a backlight driving apparatus of an LCD apparatus according to an embodiment of the present invention.

FIG. 4 is a block diagram showing a configuration of a backlight driving apparatus of a liquid crystal display (LCD) apparatus according to an embodiment of the present invention.

Referring to FIG. 4, the backlight driving apparatus 300 according to the embodiment of the present invention includes a master DC/AC switching portion 205, a slave DC/AC switching portion 206, a master trans 207 and a slave trans 208.

The backlight driving apparatus 300 further includes a lamp driving controller 301 for generating a push-pull gate signal for controlling a plurality of lamps 201 in accordance with the burst dimming signal, a master driver 302 and a slave driver 303 for generating pull-bridge gate signals for driving the plurality of lamps 201 in response to the push-pull gate signal, first and second master voltage splitters 304 and 305 for lowering and feeding back a master AC voltage outputted from the master trans 207, first and second slave voltage splitters 306 and 307 for lowering and feeding back a slave AC voltage outputted from the slave trans 208, an operated condition detector 308 for converting an AC error voltage generated on a basis of a phase difference between the master AC voltage and the slave AC voltage fed back by the first master voltage splitter 304 and the first slave voltage splitter 306 into a DC error voltage, a master AC/DC converter 309 for converting the master AC voltage fed back by the second master voltage splitter 305 into a master DC voltage, and a slave AC/DC converter 310 for converting the slave AC voltage fed back by the second slave voltage splitter 307 into a slave DC voltage, and a protective controller 311 for directly outputting an operated error signal to the lamp driving controller 301 using a voltage fed back via the operated condition detector 308 to stop driving the master driver 302 and the slave driver 303 when an error is generated during the operation and for directly outputting an initial error signal to the lamp driving controller 301 using a voltage fed back via the master AC/DC converter 309 and/or the slave AC/DC converter 310 to stop driving the master driver 302 and the slave driver 303 when an initial driving error is generated.

The lamp driving controller 301 generates the push-pull gate signal for controlling the switching operations of the master AC/DC switching portion 205 and the slave AC/DC switching portion 206 in accordance with the burst dimming signal, and the push-pull gate signal is supplied to the master driver 302 and the slave driver 303. When the initial error signal is generated from the protective controller 311 at an initial driving condition, the lamp driving controller 301 outputs the disable signal in response to the initial error signal to stop the drive of the master driver 302 and the slave driver 303. Also, when the operated control signal is generated from the protective controller 311 at an operating condition, the lamp driving controller 301 outputs the disable signal in response to the operated error signal to stop the drive of the master driver 302 and the slave driver 303. Herein, a lamp burst dimming signal is a signal for adjusting a brightness of the plurality of lamps 201.

The master driver 302 generates the pull-bridge gate signal for controlling a switching of the master DC/AC switching portion 205 in response to the push-pull gate signal inputted from the lamp driving controller 301 to output it to the master DC/AC switching portion 205. When the disable signal is inputted to the master driver 302 from the lamp driving controller 301 at a driving condition or at an operating condition, then the master driver 302 stops generating the pull-bridge gate signal.

The slave driver 303 generates the pull-bridge gate signal for controlling a switching of the slave DC/AC switching portion 206 in response to the push-pull gate signal inputted from the lamp driving controller 301 to output it to the slave DC/AC switching portion 206. When the disable signal is inputted to the slave driver 303 from the lamp driving controller 301 at a driving condition or at an operating condition, then the slave driver 303 stops generating the pull-bridge gate signal.

The first master voltage splitter 304 drops a master AC voltage of 1.2 KV to 1.3 KV outputted from the master trans 207 into 12V to 13V and feeds it back to the operated condition detector 308. The second master voltage splitter 305 drops a master AC voltage of 1.2 KV to 1.3 KV outputted from the master trans 207 into 12V to 13V and feeds it back to the master AC/DC converter 309.

The first slave voltage splitter 306 drops a slave AC voltage of 1.2 KV to 1.3 KV outputted from the slave trans 208 into 12V to 13V and feeds it back to the operated condition detector 308. The second slave voltage splitter 307 drops a master AC voltage of 1.2 KV to 1.3 KV outputted from the slave trans 208 into 12V to 13V and feeds it back to the slave AC/DC converter 310.

The operated condition detector 308 converts an AC error voltage generated on a basis of a phase difference between the master AC voltage and the slave AC voltage fed back by the first master voltage splitter 304 and the first slave voltage splitter 306 into a DC error voltage and outputs it to the protective controller 311. When there is no phase difference between the master AC voltage and the slave AC voltage, the operated condition detector 308 outputs substantially 0V to the protective controller 311.

The master AC/DC converter 309 converts the master AC voltage fed back by the second master voltage splitter 305 into a master DC voltage and outputs it to the protective controller 311.

The slave AC/DC converter 310 converts the slave AC voltage fed back by the second slave voltage splitter 307 into a slave DC voltage and outputs it to the protective controller 311.

The protective controller 311 converts the analog DC voltage fed back by the master AC/DC converter 309 and the slave AC/DC converter 310 into first and second digital feedback voltages, and compares the magnitude of the first and second digital feedback voltages with the reference initial voltage to judge whether there is an error at the initial driving condition. When the magnitude of the digital feedback voltages is the same as the reference initial voltage, the protective controller 311 determines that the initial driving condition is normal and outputs an enable signal to the lamp driving controller 301. When the magnitudes are different from each other, then the protective controller 311 determines that there is an error at the initial driving condition and outputs the initial error signal to the lamp driving controller 301.

The protective controller 311 also converts the analog DC voltage fed back by the operated condition detector 308 into the digital feedback voltage, and compares the magnitude of the digital feedback voltage with the reference operating voltage to determine whether there is an error at the operating condition. When the magnitude of the digital feedback voltage is the same as the reference initial voltage, the protective controller 311 determines that the operating condition is normal and outputs the enable signal to the lamp driving controller 301. When the magnitudes are different from each other, then the protective controller 311 determines that there is an error at the operating condition and outputs the operated error signal to the lamp driving controller 301. Herein, when the operating condition is normal, then because the phases of a master AC voltage and a slave AC voltage fed back by the first master voltage splitter 304 and the first slave voltage splitter 306 are the same, the operated condition detector 308 substantially outputs a voltage of 0V to the protective controller 311. On the other hand, when an error is generated during an operation, then because a phase difference between a master AC voltage and a slave AC voltage fed back by the first master voltage splitter 304 and the first slave voltage splitter 306 is generated, the operated condition detector 308 converts an AC error voltage among an operations generated by a phase difference between the fed back master AC voltage and the slave AC voltage into a DC error voltage to output it to the protective controller 311. In other words, the protective controller 311 converts an analog DC error voltage converted by the operated condition detector 308 into a digital error voltage, and compares the reference operating voltage with the digital error voltage to judge whether there is an error.

As described above, when an error is generated during the operation of the backlight driving apparatus according to the present invention, the protective controller 311 detects the generation of an error using a feed back voltage, and then outputs an operated error signal to the lamp driving controller 301. The lamp driving controller 301 then outputs the disable signal in response to the operated error signal to stop driving the master driver 302 and the slave driver 303.

The backlight driving apparatus according to the present invention detects an error during the operation and the protective controller 311 then stops driving the master driver 302 and the slave driver 303. Accordingly, a damage to an inspector such as an electric shock can be minimized or prevented.

Figure 5:
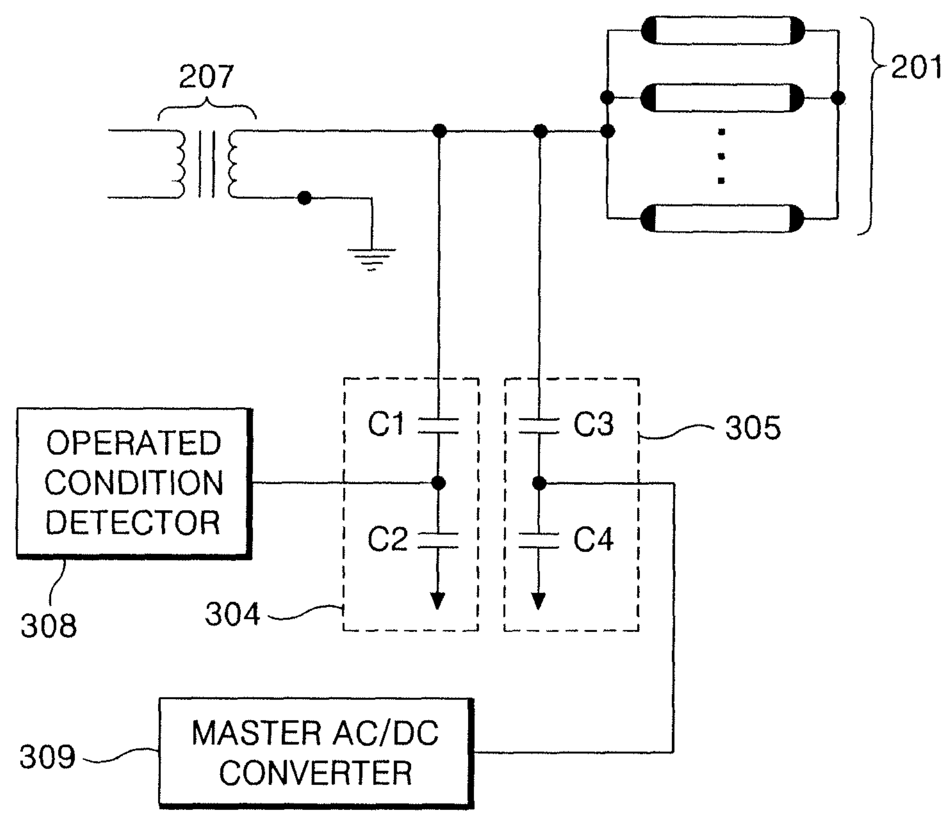
FIG. 5 is a circuit diagram of the first and second master voltage splitters shown in FIG. 4.

FIG. 5 is a circuit diagram of the first and second master voltage splitters shown in FIG. 4.

Referring to FIG. 5, the first master voltage splitter 304 includes capacitors C1 and C2 serially connected between an output the master trans 207 and the ground. A voltage allotted by the capacitors C1 and C2 is transmitted to the operated condition detector 308 via a node positioned between the capacitors C1 and C2.

The second master voltage splitter 305 includes capacitors C3 and C4 serially connected between an output the master trans 207 and the ground. The capacitors C3 and C4 are connected to the capacitors C1 and C2 in parallel. A voltage allotted by the capacitors C3 and C4 is transmitted to the master AC/DC converter 309 via a node positioned between the capacitors C3 and C4.

Figure 6:
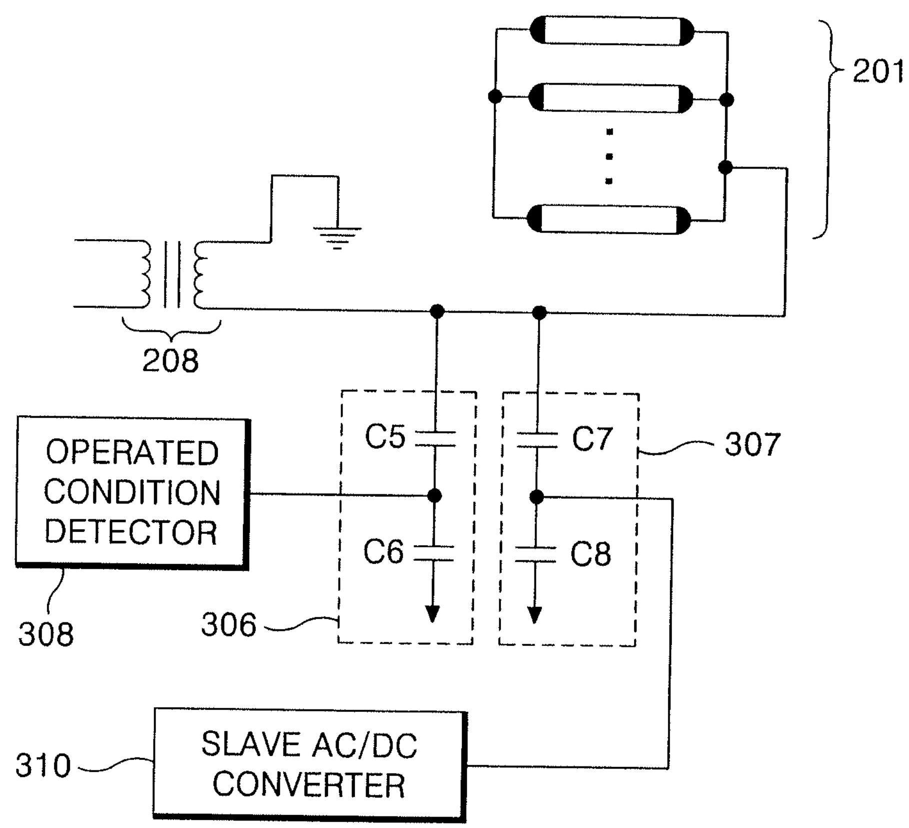
FIG. 6 is a circuit diagram of the first and second slave voltage splitters shown in FIG. 4.

FIG. 6 is a circuit diagram of the first and second slave voltage splitters shown in FIG. 4.

Referring to FIG. 6, the first slave voltage splitter 306 includes capacitors C5 and C6 serially connected between an output the slave trans 208 and the ground. A voltage allotted by the capacitors C5 and C6 is transmitted to the operated condition detector 308 via a node positioned between the capacitors C5 and C6.

The second slave voltage splitter 307 includes capacitors C7 and C8 serially connected between an output the slave trans 208 and the ground. The capacitors C7 and C8 are connected to the capacitors C5 and C6 in parallel. A voltage allotted by the capacitors C7 and C8 is transmitted to the slave AC/DC converter 310 via a node positioned between the capacitors C7 and C8.

Figure 7:
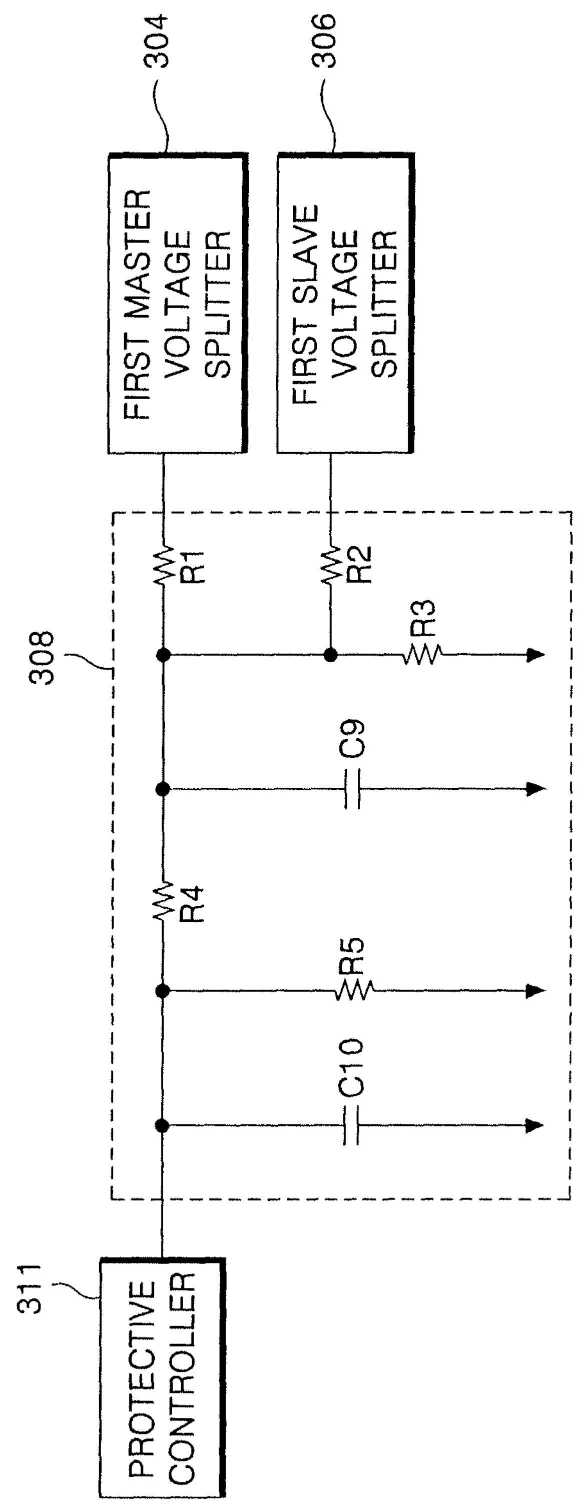
FIG. 7 is a circuit diagram of the operated condition detector shown in FIG. 4.

FIG. 7 is a circuit diagram of an operated condition detector shown in FIG. 4.

Referring to FIG. 7, the operated condition detector 308 includes a resistance R1 connected to an output the first master voltage splitter 304, a resistance R2 connected to an output the first slave voltage splitter 306, a resistance R3 connected between the resistances R1 and R2 and the ground, a resistance connected between the protective controller 311 and the resistance RE a resistance R5 connected between the protective controller 311 and the resistance R4 and the ground. The operated condition detector 308 further includes a capacitor C9 connected between the resistances R1 and R4 and the ground, and a capacitor C10 connected between the protective controller 311 and the resistance R4 and the ground. The capacitor C9 is connected to the resistance R3 in parallel and C10 is connected to the resistance R5 in parallel.

Figure 8:
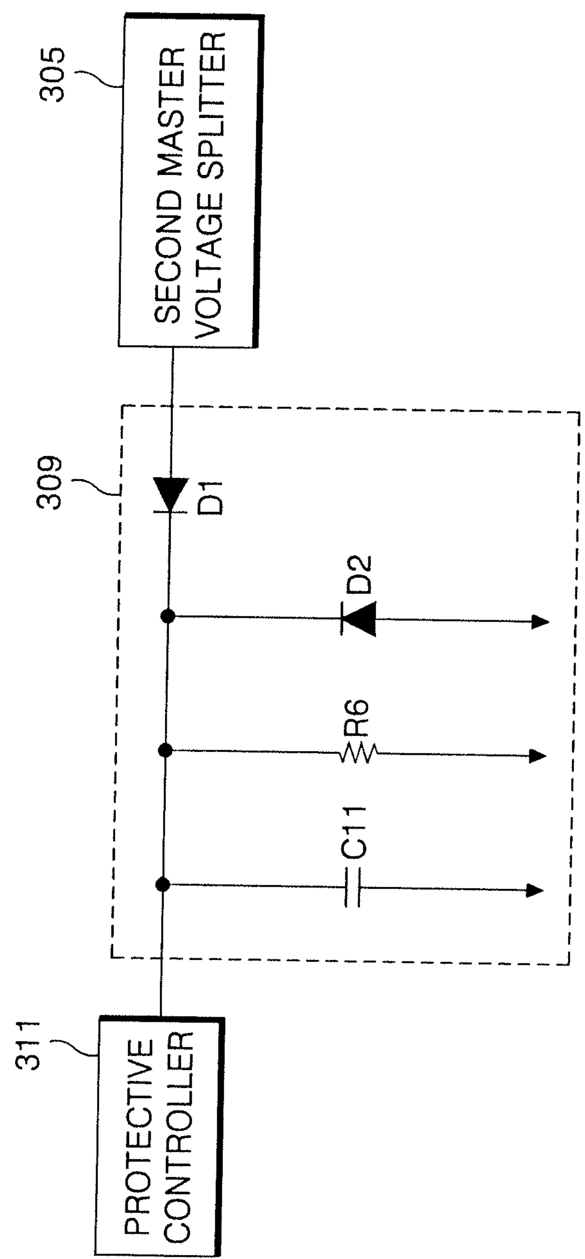
FIG. 8 is a circuit diagram of the master AC/DC converter shown in FIG. 4.

FIG. 8 is a circuit diagram of the master AC/DC converter shown in FIG. 4.

Referring to FIG. 8, the master AC/DC converter 309 includes a diode D1 in which an anode is connected to an output the second master voltage splitter 305 and a cathode is connected to the protective controller 311, a diode D2 in which an anode is connected to the ground and a cathode is connected to the cathode of the diode D1, a resistance R6 connected between the cathode of the diode D1 and the protective controller 311 and the ground, and a capacitor C11 connected between the cathode of the diode D1 and the protective controller 311 and the ground. C11 is also connected to the resistance R6 in parallel. Also, the cathode of the diode D2 is connected to the diode D1 and R6 is connected to the diode D2 in parallel.

Figure 9:
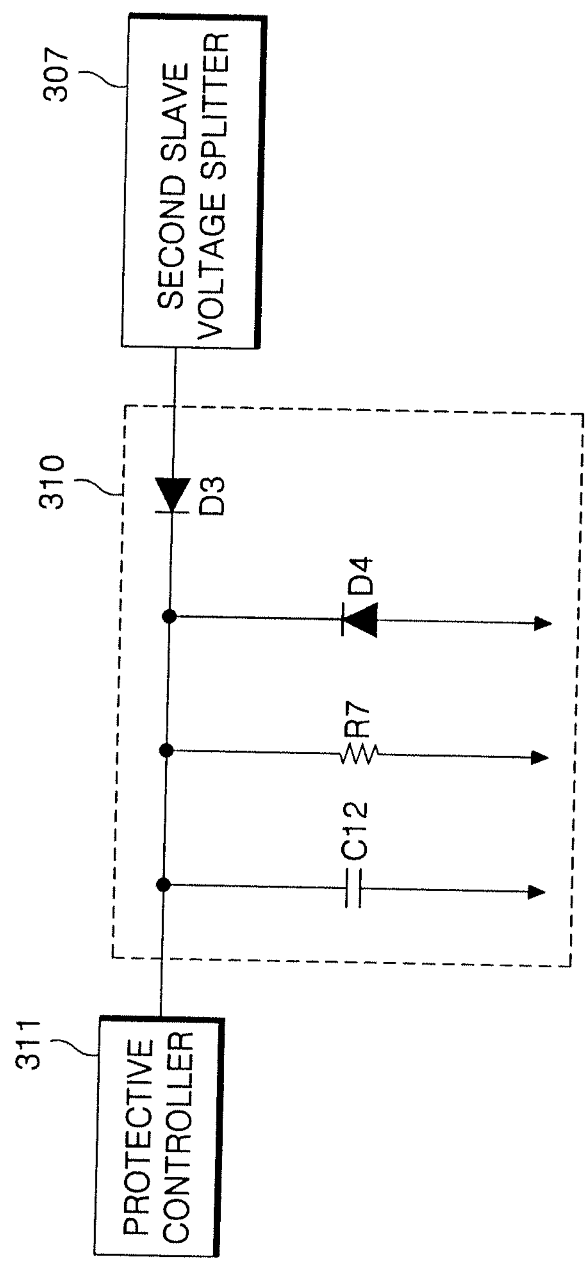
FIG. 9 is a circuit diagram of the slave AC/DC converter shown in FIG. 4.

FIG. 9 is a circuit diagram of the slave AC/DC converter shown in FIG. 4.

Referring to FIG. 9, the slave AC/DC converter 310 includes a diode D3 in which an anode is connected to an output the second slave voltage splitter 307 and a cathode is connected to the protective controller 311, a diode D4 in which an anode is connected to the ground and a cathode is connected to the cathode of the diode D3, a resistance R7 connected between the cathode of the diode D3 and the protective controller 311 and the ground, and a capacitor C12 connected between the cathode of the diode D3 and the protective controller 311 and the ground. C12 is also connected to the resistance R7 in parallel. Also, the cathode of the diode D4 is connected to the diode D3 and R7 is connected to the diode D4 in parallel.

Figure 10:
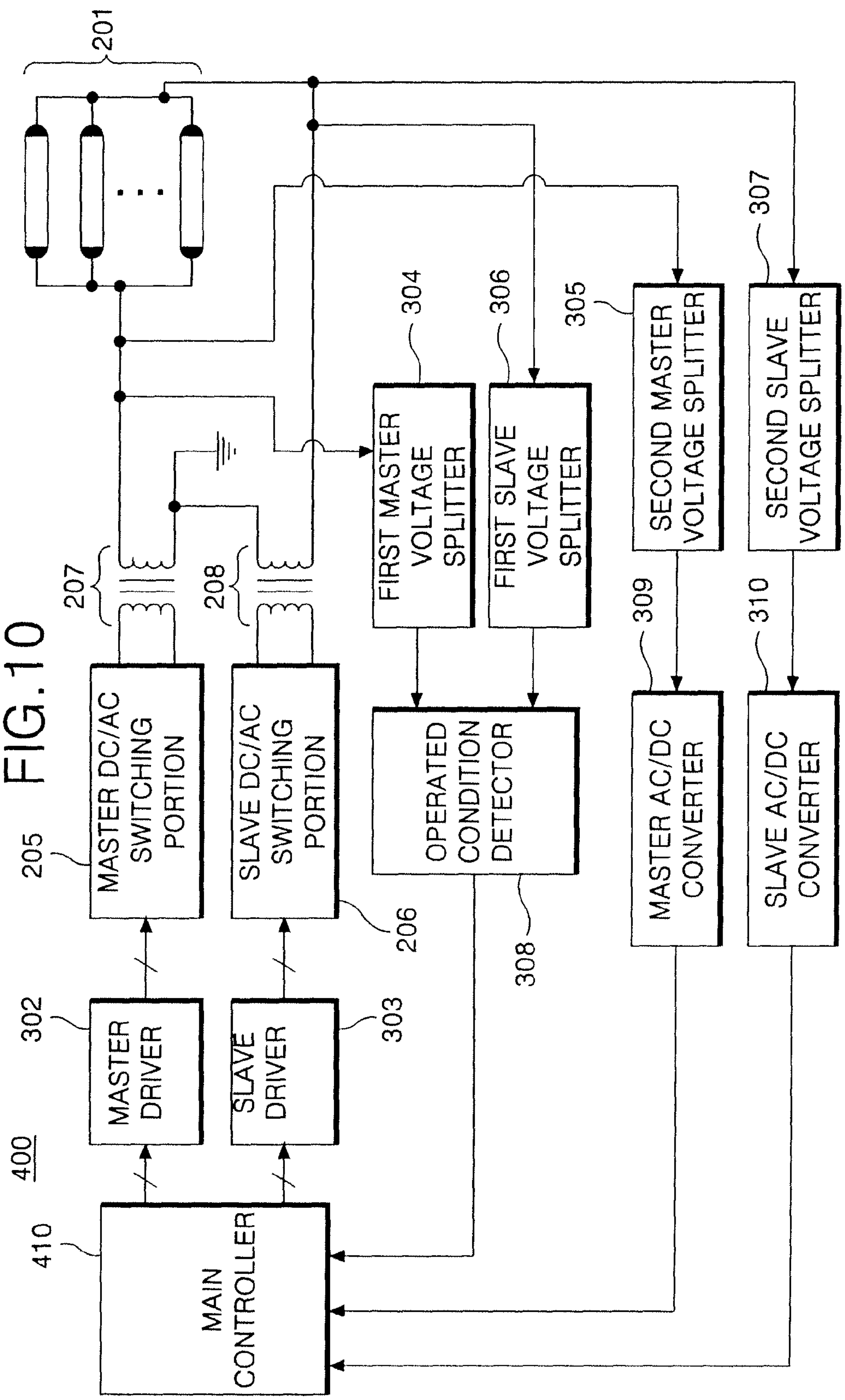
FIG. 10 is a block diagram illustrating a configuration of a backlight driving apparatus of an LCD apparatus according to another embodiment of the present invention.

FIG. 10 is a block diagram illustrating a configuration of a backlight driving apparatus of an LCD apparatus according to another embodiment of the present invention.

Referring to FIG. 10, a backlight driving apparatus 300 similar to the backlight driving apparatus 300 illustrated in FIG. 4 includes a master AC/DC switching portion 205, a slave AC/DC switching portion 206, a master trans 207, a slave trans 208, a master driver 302, a slave driver 303, first and second master voltage splitters 304 and 305, first and second slave voltage splitters 306 and 307, an operated condition detector 308, a master AC/DC converter 309 and a slave AC/DC converter 310.

The backlight driving apparatus 400 also includes a main controller 410 for generating a push-pull gate signal for controlling the plurality of lamps 201 in accordance with the burst dimming signal and for generating an operated error signal that judges an error during an operation using a voltage fed back via the operated condition detector 308 to indicate a drive stop of the master driver 302 and the slave driver 303 when an error is generated, and for generating an initial error signal that judges an error of an initial drive using a voltage fed back via the master AC/DC converter 309 and/or the slave AC/DC converter 310 to indicate a drive stop of the master driver 302 and the slave driver 303 when an error is generated.

The lamp driving controller 301 and the protective controller 311 illustrated in FIG. 4 are implemented in the main controller 410 of a single chip, and a function thereof is as follows.

The main controller 410 generates a push-pull gate signal for controlling an switching operations of the master DC/AC switching portions 205 and the slave DC/AC switching portions in accordance with the lamp burst dimming signal to supply them to the master driver 302 and the slave driver 303.

The main controller 410 converts the analog DC voltage fed back by the master AC/DC converter 309 and the slave AC/DC converter 310 into first and second digital feedback voltages, and compares the magnitude of the first and second digital feedback voltages with the reference initial voltage to judge whether there is an error at the initial driving condition. When the magnitude of the digital feedback voltages is the same as the reference initial voltage, the main controller 410 judges the initial driving condition as a normal to output the enable signal. When the magnitudes are different from each other, then the main controller 410 judges a generation of an error at the initial driving condition to output the initial error signal.

The main controller 410 converts the analog DC voltage fed back by the operated condition detector 308 into the digital feedback voltage, and compares the magnitude of the digital feedback voltage with the reference operating voltage to judge whether there is an error at the operating condition. When the magnitude of the digital feedback voltage is the same as the reference initial voltage, the main controller 410 judges the operating condition as a normal to output the enable signal. When the magnitudes are different from each other, then the main controller 410 judges a generation of an error at the operating condition to output the operated error signal. In other words, the main controller 410 converts an analog DC error voltage converted by the operated condition detector 308 into the digital error voltage, and compares the reference operating voltage with the digital error voltage to judge whether there is an error during an operation.

If an initial error signal is generated at an initial driving condition, then the main controller 410 outputs the disable signal in response to an initial error signal to stop driving the master driver 302 and the slave driver 303. Also, if an operated error signal is generated at an operating condition, then the main controller 410 outputs the disable signal in response to an operated error signal to stop driving the master driver 302 and the slave driver 303.

As described above, in the backlight driving apparatus 400 according to another embodiment of the present invention, if an error is generated during an operation, then the main controller 410 detects the generation of an error during an operation using a feedback voltage and then outputs the disable signal to stop driving the master driver 302 and the slave driver 303.

Figure 11:
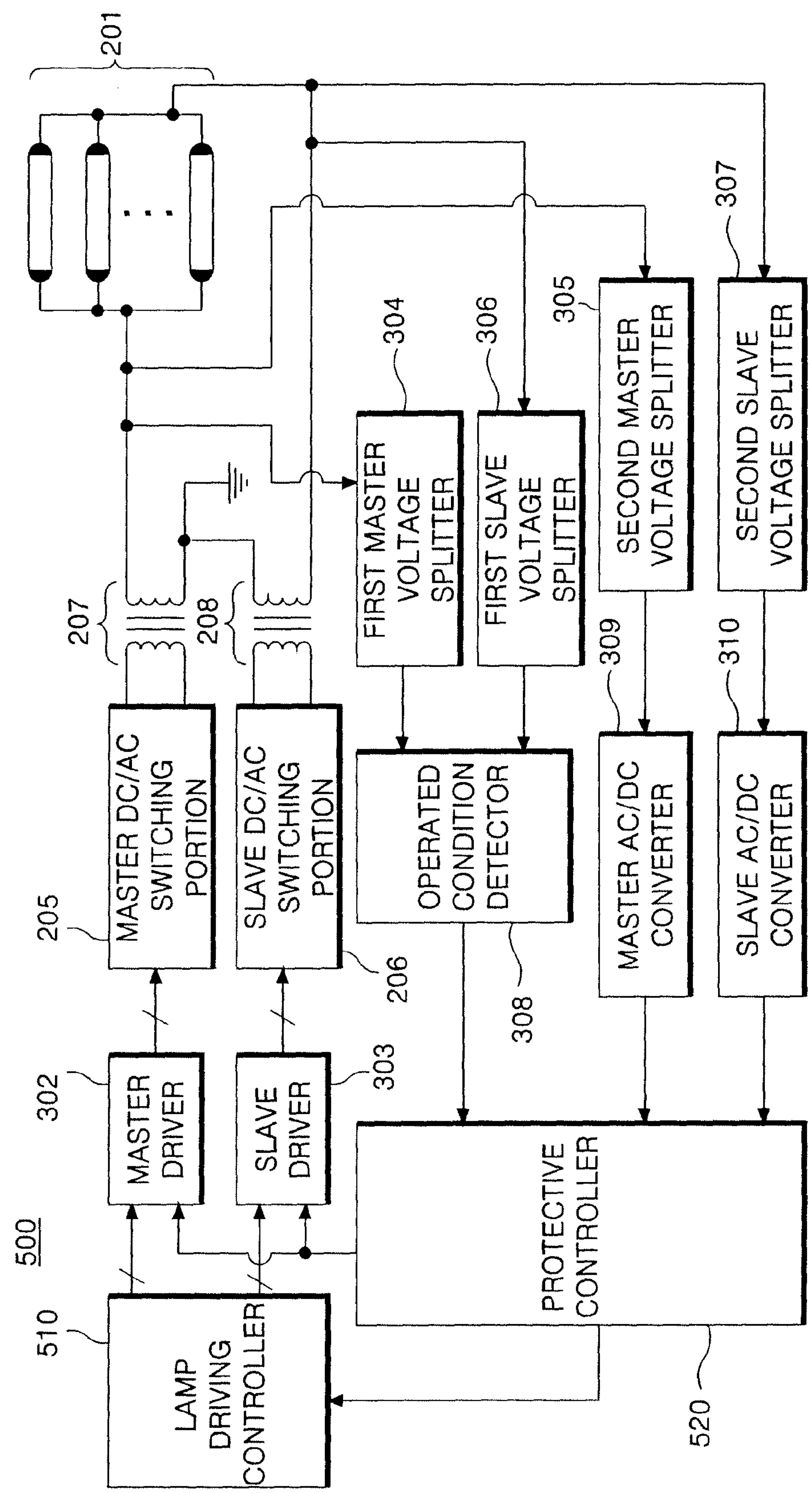
FIG. 11 is a block diagram illustrating a configuration of a backlight driving apparatus according to still another embodiment of the present invention.

FIG. 11 is a block diagram illustrating a configuration of a backlight driving apparatus according to still another embodiment of the present invention.

Referring to FIG. 11, the backlight driving apparatus 500 similar to the backlight driving apparatus 300 illustrated in FIG. 4 includes a master AC/DC switching portion 205, a slave AC/DC switching portion 206, a master trans 207, a slave trans 208, a master driver 302, a slave driver 303, first and second master voltage splitters 304 and 305, first and second slave voltage splitters 306 and 307, an operated condition detector 308, a master AC/DC converter 309 and a slave AC/DC converter 310.

The backlight driving apparatus 500 also includes a lamp driving controller 510 for generating a push-pull gate signal for controlling the plurality of lamps 201 in accordance with the burst dimming signal and a protective controller 520 for directly outputting an operated error signal that judges an error during an operation using a voltage fed back via the operated condition detector 308 to indicate a drive stop of the master driver 302 and the slave driver 303 when an error is generated, and for outputting an initial error signal that judges an error of an initial drive using a voltage fed back via the master AC/DC converter 309 and the slave AC/DC converter 310 to indicate a drive stop of the master driver 302 and the slave driver 303 when an error is generated to the lamp driving controller 510.

The lamp driving controller 510 generates the push-pull gate signal for controlling the switching operations of the master AC/DC switching portion 205 and the slave AC/DC switching portion 206 in accordance with the burst dimming signal, and the push-pull gate signal is supplied to the master driver 302 and the slave driver 303. When the initial error signal is generated from the protective controller 520 at an initial driving condition, the lamp driving controller 510 outputs the disable signal in response to the initial error signal to stop the drive of the master driver 302 and the slave driver 303.

An analog master DC voltage fed back via the master AC/DC converter 309 and an analog slave DC voltage fed back via the slave AC/DC converter 310 are inputted to the protective controller 520 at an initial driving condition, then the protective controller 520 converts the fed back analog master DC voltage into a first digital feedback voltage and converts the fed back analog slave DC voltage into a second digital feedback voltage, and compares the magnitude of the first and second digital feedback voltages with the reference initial voltage to judge whether there is an error at the initial operation. When the magnitude of the digital feedback voltages is the same as the reference initial voltage, the protective controller 520 judges the initial operation as a normal to control the lamp driving controller 510 in such a manner to allow the lamps 201 to be continuously driven. When the magnitudes are different from each other, then the protective controller 520 judges a generation of an error at the initial operation to output the initial error signal to the lamp driving controller 510. If the initial error signal is generated, then the lamp driving controller 510 outputs the disable signal to the master driver 302 and the slave driver 303 in response to the initial error signal to stop an operation of the master driver 302 and the slave driver 303.

An analog master DC voltage fed back via the operated condition detector 308 is inputted to the protective controller 520 at an operating condition, then the protective controller 520 compares the magnitude of the feedback voltage with the reference initial voltage to output the enable signal or the disable signal to the master driver 302 and the slave driver 303 in accordance with the result. When the magnitude of the feedback voltage is the same as the reference initial voltage, the protective controller 520 generates the enable signal to output it to the master driver 302 and the slave driver 303. When the magnitudes are different from each other, then the protective controller 520 generates the disable signal to output it to the master driver 302 and the slave driver 303. If the disable signal is inputted from the protective controller 520, then the operations of the master driver 302 and the slave driver 303 are stopped by the disable signal.

The master driver 302 generates the pull-bridge gate signal for controlling a switching of the master DC/AC switching portion 205 in response to the push-pull gate signal inputted from the lamp driving controller 510 to output it to the master DC/AC switching portion 205. When the disable signal is inputted to the master driver 302 from the lamp driving controller 510 at initial driving condition, then the master driver 302 stops generating the pull-bridge gate signal. When the disable signal is inputted to the master driver 302 from the protective controller 520 at operating condition, then the master driver 302 stops generating the pull-bridge gate signal. On the other hand, when the enable signal is inputted to the master driver 302 from the protective controller 520 at operating condition, then the master driver 302 generates the pull-bridge gate signal in response to the push-pull gate signal inputted from the lamp driving controller 510.

The slave driver 303 generates the pull-bridge gate signal for controlling a switching of the slave DC/AC switching portion 206 in response to the push-pull gate signal inputted from the lamp driving controller 510 to output it to the slave DC/AC switching portion 206. When the disable signal is inputted to the slave driver 303 from the lamp driving controller 510 at initial driving condition, then the slave driver 303 stops generating the pull-bridge gate signal. And when the disable signal is inputted to the slave driver 303 from the protective controller 520 at operating condition, then the slave driver 303 stops generating the pull-bridge gate signal. On the other hand, when the enable signal is inputted to the slave driver 303 from the protective controller 520 at operating condition, then the slave driver 303 generates the pull-bridge gate signal in response to the push-pull gate signal inputted from the lamp driving controller 510.

Figure 12:
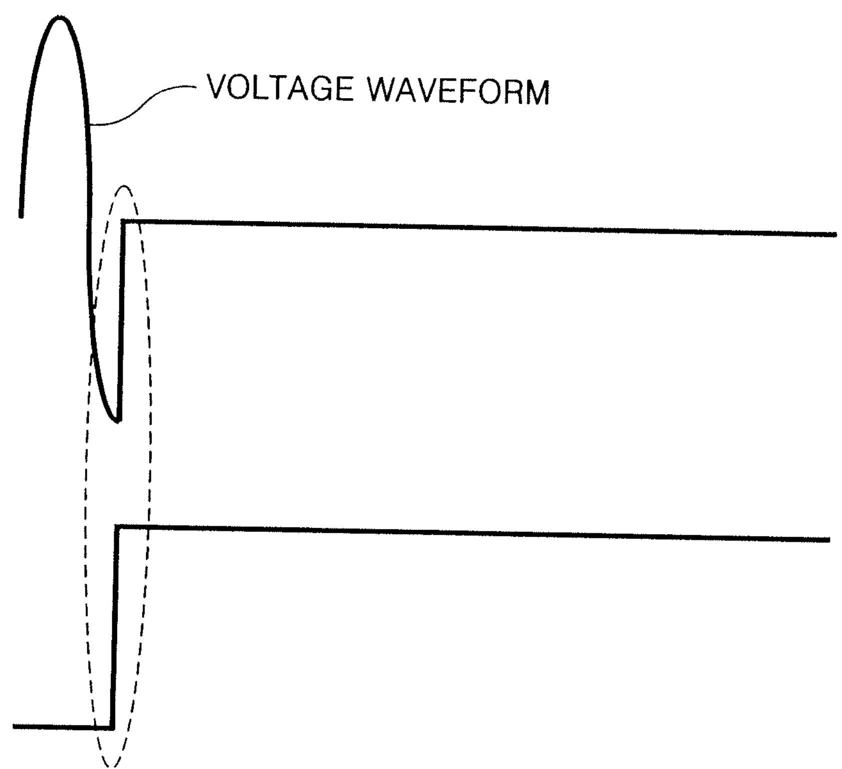
FIG. 12 is a voltage waveform when an error is generated during the operation of the backlight driving apparatus of an LCD apparatus according to still another embodiment of the present invention.

As described above, if an error is generated during an operation of the backlight driving apparatus 500, then the protective controller 520 directly outputs the disable signal to the master driver 302 and the slave driver 303 to stop a drive thereof, so that the backlight driving apparatus 500 spends a time of approximately 10 μs from an error generation point during an operation to a drive stop point of the master driver 302 and the slave driver 303. Accordingly, the backlight driving apparatus 500 substantially reduces the duration of a high voltage that may inflict a damage to an inspector such as an electric shock, etc., as illustrated in FIG. 12.

The lamp driving controller 510 and the protective controller 520 may be implemented in a single chip.

Figure 13:
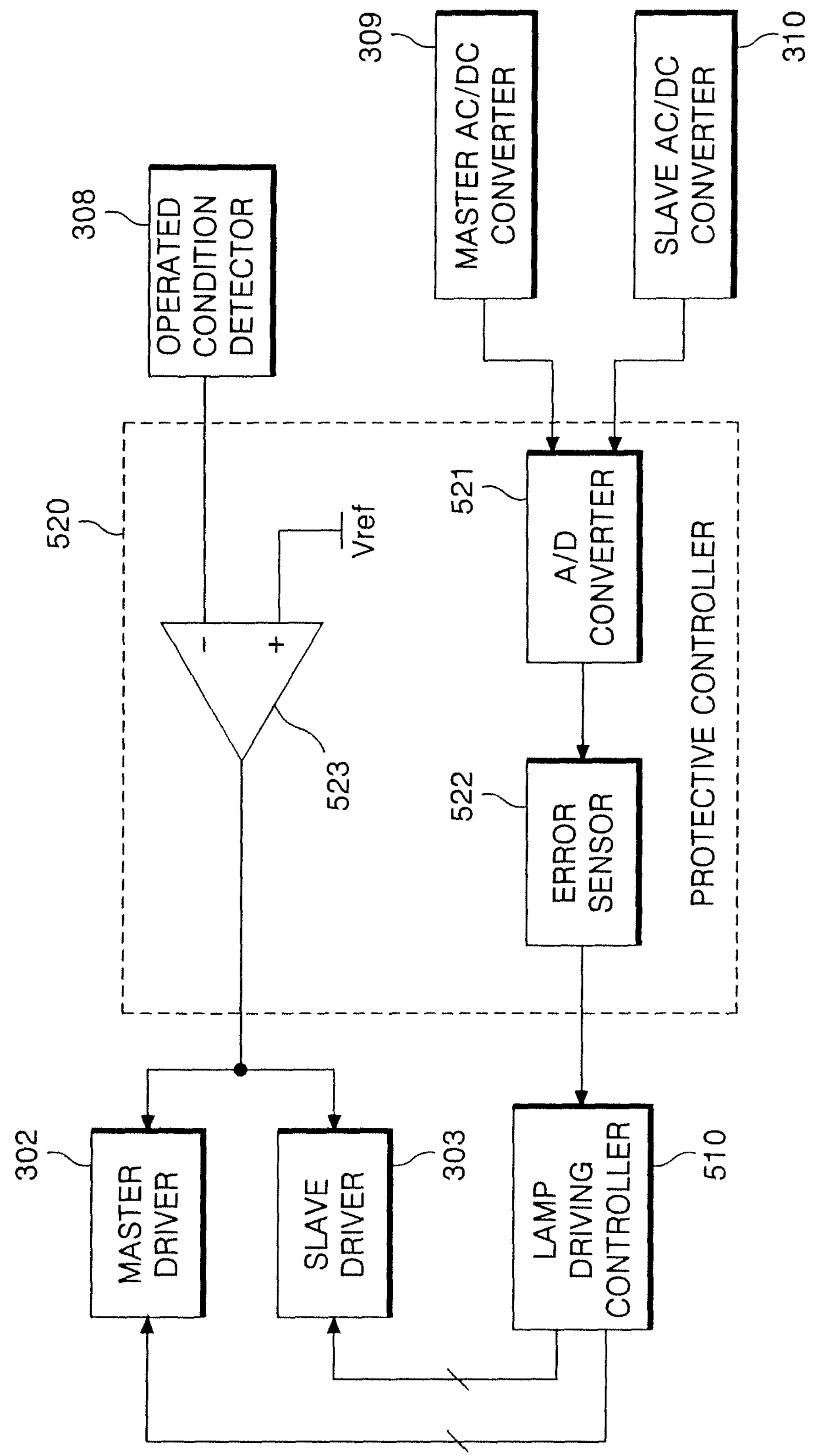
FIG. 13 is a block diagram illustrating a configuration of the protective controller shown in FIG. 11.

FIG. 13 a block diagram illustrating a configuration of the protective controller shown in FIG. 11.

Referring to FIG. 13, the protective controller 520 includes an AID converter 521 for converting an analog DC voltage fed back via the master AC/DC converter 309 and the slave AC/DC converter 310 into the first and second digital feedback voltages at the initial driving condition, an error sensor 522 for comparing a magnitude of the first and second digital feedback voltages with the reference initial voltage to output an initial normal signal that shows a normal of the initial error signal or an initial operation to the lamp driving controller 510 in accordance with the result, and a comparator 523 for comparing a magnitude of an analog DC voltage fed back via the operated condition detector 308 with the reference operating voltage at an operating condition to output the enable signal or the disable signal to the master driver 302 and the slave driver 303 in accordance with the result.

If an analog master DC voltage fed back via the master AC/DC converter 309 and an analog slave DC voltage fed back via the slave AC/DC converter 310 are inputted to the A/D converter 521 at the initial driving condition, then the A/D converter 521 converts the fed back analog master DC voltage into a first digital feedback voltage and converts the fed back analog slave DC voltage into a second digital feedback voltage to output them to the error sensor 522. Herein, the A/D converter 521 sequentially outputs first and second digital feedback voltage, and the output order is set in a hardware system method. For example, the A/D converter 521 primarily outputs a first digital feedback voltage inputted to one input terminal of two input terminals, and then outputs a second digital feedback voltage inputted to another input terminal.

The error sensor 522 compares a magnitude of a first and second digital feedback voltage converted by the A/D converter 521 with the reference initial voltage to judge an error generation of an initial operation. When the magnitude of a first and second digital feedback voltage is the same as the reference initial voltage, the error sensor 522 judges an initial operation as a normal to output an initial normal signal to the lamp driving controller 510. When the magnitudes are different from each other, the error sensor 522 judges an error generation of the initial operation to output the initial error signal to the lamp driving controller 510.

The comparator 523 is inputted with the reference operating voltage through a non-inverted input terminal (+) and a voltage fed back through an inverted input terminal (−) to output the disable signal and the enable signal to the master driver 302 and the slave driver 303 connected to an output terminal.

If an analog DC voltage fed back via the operated condition detector 308 is inputted to the non-inverted input terminal (+) and the reference operating voltage is inputted to the inverted input terminal (−) at the operating condition, then the comparator 523 compares a magnitude of the feedback voltage with the reference operating voltage to output the enable signal to the disable signal to the master driver 302 and the slave driver 303 in accordance with the result. When the magnitudes are the same, the comparator 523 generates the enable signal to output it to the master driver 302 and the slave driver 303. When the magnitudes are different from each other, the comparator 523 generates the disable signal to output the master driver 302 and the slave driver 303.

As described above, the present invention automatically shields a voltage supply upon the generation of an error during an operation of lamps of the liquid crystal display apparatus, so that it becomes possible to minimize or prevent a damage caused by an error to an inspector.

Also, the present invention substantially reduces a time interval until a shielding point of a voltage supply upon a generation of an error among the operations of lamps of the liquid crystal display apparatus, so that it becomes possible to minimize or prevent a high voltage from inflicting a damage such as an electric shock, etc to an inspector.

Figure 14:
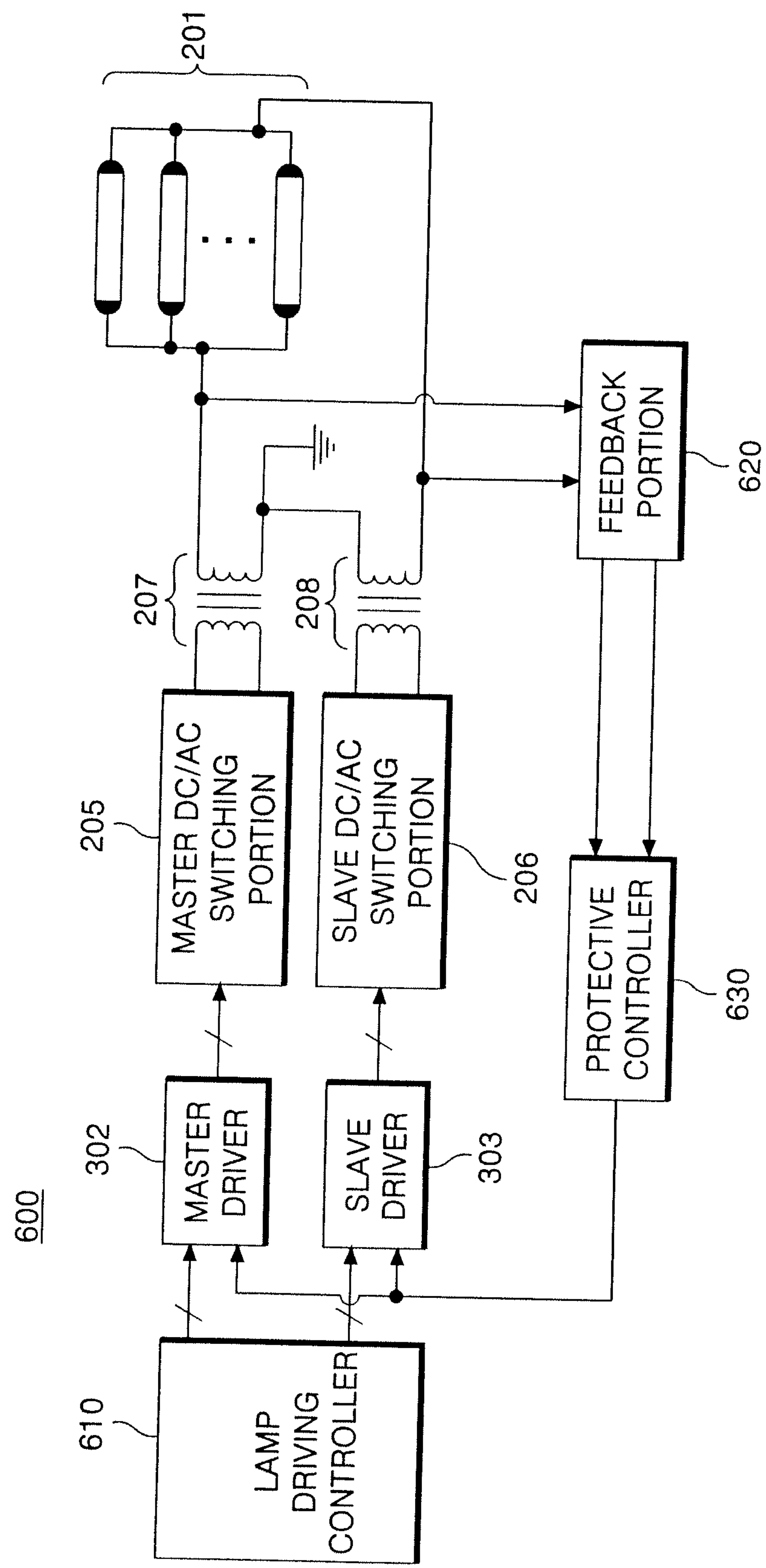
FIG. 14 is a block diagram illustrating a configuration of a backlight driving apparatus of a liquid crystal display apparatus according to still another embodiment of the present invention.

FIG. 14 is a block diagram illustrating a configuration of a backlight driving apparatus of a liquid crystal display apparatus according to still another embodiment of the present invention.

Referring to FIG. 14, the backlight driving apparatus 600 similar to the backlight driving apparatus 500 illustrated in FIG. 11 includes a master driver 302, a slave driver 303, a master AC/DC switching portion 205, a slave AC/DC switching portion 206, a master trans 207, a slave trans 208.

The backlight driving apparatus 600 includes a lamp driving controller 610 for controlling the master driver 302 and the slave driver 303 in accordance with the inputted burst dimming signal, a feedback portion 620 for feeding back a master AC voltage outputted from the master trans 207 and a slave AC voltage outputted from the slave trans 208, and a protective controller 630 for detecting the generation of an error using a master AC voltage and a slave AC voltage fed back by the feedback portion 620 to stop driving the master driver 302 and the slave driver 303 upon generation of an error.

The feedback portion 620 feeds back an output voltage of the master driver 302 and the slave driver 303, and a feedback method may be diversely implemented. Also, a method of driving the protective controller 630 is diversified in accordance with a feedback method of the feedback portion 620.

First, a case where the feedback portion 620 is implemented by a first feedback method will be described.

The feedback portion 620 drops and feeds back a master AC voltage outputted from the master trans 207, and drops and feeds back a slave AC voltage outputted from the slave trans 208 at the initial condition. Herein, the feedback portion 620 converts a feedback master AC voltage into a feedback master DC voltage and converts a feedback slave AC voltage into a feedback slave DC voltage to feed back them to the protective controller 630. Specially, the feedback portion 620 sequentially outputs a feedback master DC voltage and a feedback slave DC voltage to the protective controller 630 at the initial condition.

The feedback portion 620 drops a master AC voltage fed back from the master trans 207 and drops a slave AC voltage fed back from the slave trans 208 at the operating condition, and then converts an analog AC voltage generated by a phase difference between the fed back master AC voltage and the slave AC voltage into an analog DC voltage to output it to the protective controller 630. Herein, when there is no phase difference between the fed back master AC voltage and the slave AC voltage, the feedback portion 620 outputs substantially 0V to the protective controller 630 because the fed back master AC voltage and the slave AC voltage have an inverse phase relation.

The protective controller 630 converts an analog DC voltage fed back via the feed back portion 620 into a digital feedback voltage at the initial condition, and compares the magnitude of the reference initial voltage with a digital feedback voltage to judge whether there is an error at the initial driving condition. When the magnitude of the reference initial voltage is the same as a digital feedback voltage, the protective controller 630 judges the initial driving condition as a normal to output an enable signal to the master driver 302 and the slave driver 303. When the magnitudes are different from each other, then the protective controller 630 judges a generation of an error at the initial condition to output a disable signal to the master driver 302 and the slave driver 303.

The protective controller 630 converts an analog DC voltage fed back via the feed back portion 620 into a digital AC voltage at the operating condition, and compares the magnitude of the reference initial voltage with a digital AC voltage to judge whether there is an error at the operating condition. When the magnitude of the reference initial voltage is the same as a digital AC voltage, the protective controller 630 judges the operating condition as a normal to output an enable signal to the master driver 302 and the slave driver 303. When the magnitudes are different from each other, then the protective controller 630 judges a generation of an error at the operating condition to output a disable signal to the master driver 302 and the slave driver 303.

Next, a case where the feedback portion 620 is implemented by a second feed back method will be described.

The feedback portion 620 drops and feeds back a master AC voltage outputted from the master trans 207, and drops and feeds back a slave AC voltage outputted from the slave trans 208 at the operating condition. Herein, the feedback portion 620 converts a feedback master AC voltage into a feedback master DC voltage and converts a feedback slave AC voltage into a feedback slave DC voltage to feed back them to the protective controller 630. Specially, the feedback portion 620 sequentially outputs a feedback master DC voltage and a feedback slave DC voltage to the protective controller 630 at the operating condition.

And, the feedback portion 620 drops a master AC voltage fed back from the master trans 207 and drops a slave AC voltage fed back from the slave trans 208 at the initial condition, and then converts an analog AC voltage generated by a phase difference between the fed back master AC voltage and the slave AC voltage into an analog DC voltage to output it to the protective controller 630. Herein, when there is no phase difference between the fed back master AC voltage and the slave AC voltage, the feedback portion 620 outputs substantially 0V to the protective controller 630 because the fed back master AC voltage and the slave AC voltage have an inverse phase relation.

The protective controller 630 converts an analog DC voltage fed back via the feed back portion 620 into a digital feedback voltage at the operating condition, and compares the magnitude of the reference operating voltage with a digital feedback voltage to judge whether there is an error at the operating condition. When the magnitude of the reference operating voltage is the same as a digital feedback voltage, the protective controller 630 judges the operating condition as a normal to output an enable signal to the master driver 302 and the slave driver 303. When the magnitudes are different from each other, then the protective controller 630 judges a generation of an error at the operating condition to output a disable signal to the master driver 302 and the slave driver 303.

The protective controller 630 converts an analog DC voltage fed back via the feed back portion 620 into a digital AC voltage at the initial condition, and compares the magnitude of the reference initial voltage with a digital AC voltage to judge whether there is an error at the initial condition. When the magnitude of the reference initial voltage is the same as a digital AC voltage, the protective controller 630 judges the initial condition as a normal to output an enable signal to the master driver 302 and the slave driver 303. When the magnitudes are different from each other, then the protective controller 630 judges a generation of an error at the initial condition to output a disable signal to the master driver 302 and the slave driver 303.

On the other hand, the protective controller 630 may be implemented in such a manner to compare a magnitude an analog DC voltage and the reference voltage fed back via the feedback portion 620 to thereby judge whether there is an error at the initial condition or at the operating condition. In this case, the protective controller 630 does not carry out a process in which the fed back analog DC voltage is converted into a digital voltage.

Figure 15:
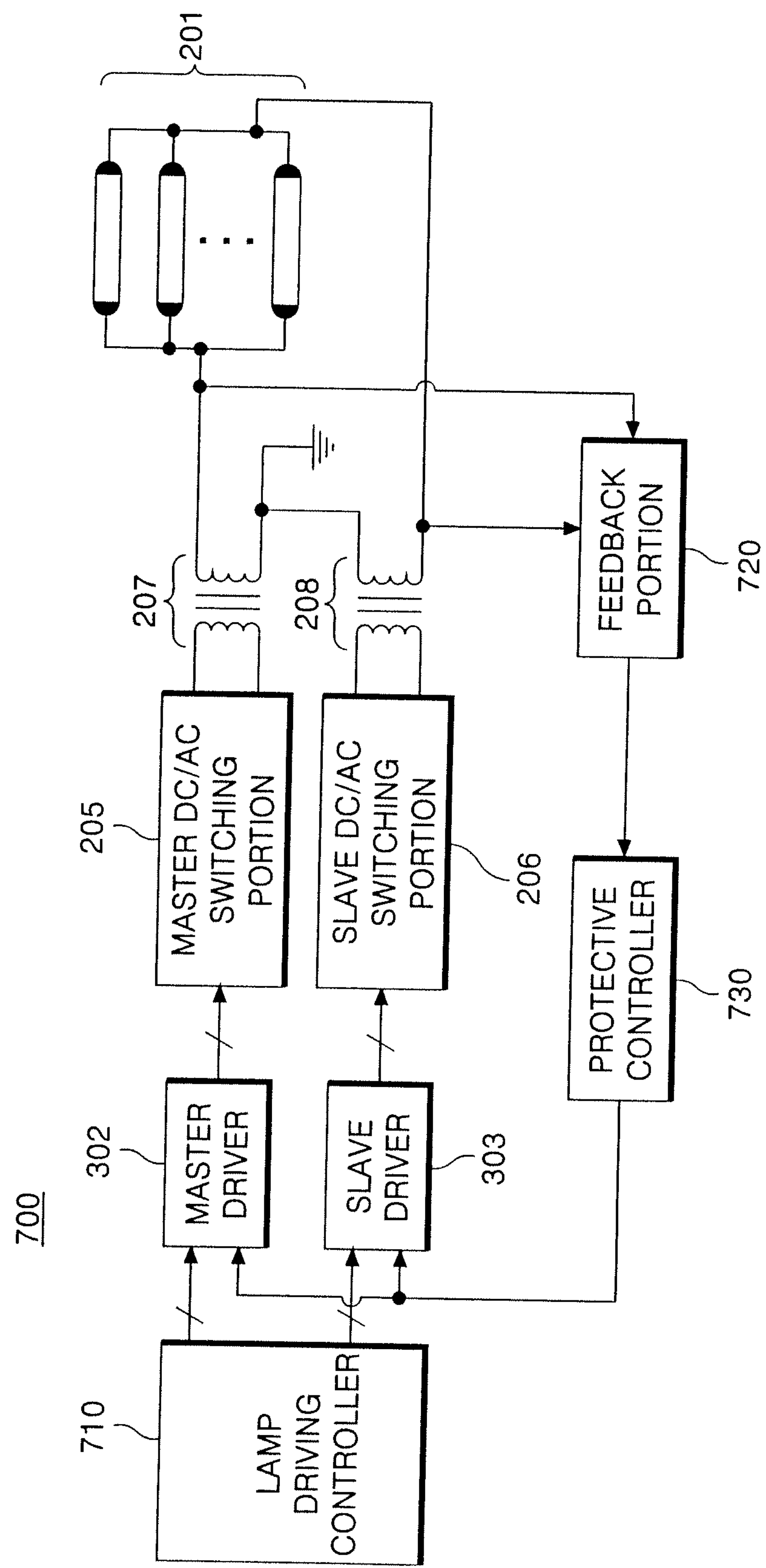
FIG. 15 is a block diagram illustrating a configuration of a backlight driving apparatus of a liquid crystal display apparatus according to yet another embodiment of the present invention.

FIG. 15 is a block diagram illustrating a configuration of a backlight driving apparatus of a liquid crystal display apparatus according to yet another embodiment of the present invention.

Referring to FIG. 15, the backlight driving apparatus 700 similar to the backlight driving apparatus 500 illustrated in FIG. 11 includes a master driver 302, a slave driver 303, a master AC/DC switching portion 205, a slave AC/DC switching portion 206, a master trans 207, and a slave trans 208.

The backlight driving apparatus 700 also includes a lamp driving controller 710 for controlling the master driver 302 and the slave driver 303 in accordance with the inputted burst dimming signal, a feedback portion 720 for feeding back a master AC voltage outputted from the master trans 207 and a slave AC voltage outputted from the slave trans 208, and a protective controller 730 for judging an error generation using a master AC voltage and a slave AC voltage fed back by the feedback portion 720 to stop driving the master driver 302 and the slave driver 303 upon generation of an error.

The feedback portion 720 feeds back an output voltage of the master driver 302 and the slave driver 303, and a feedback method may be diversely implemented. Also, a method of driving the protective controller 730 is diversified in accordance with a feedback method of the feedback portion 720.

First, a case where the feedback portion 720 is implemented by a third feedback method will be described.

The feedback portion 720 drops and feeds back a master AC voltage outputted from the master trans 207, and drops and feeds back a slave AC voltage outputted from the slave trans 208 at the initial condition or at the operating condition. Herein, the feedback portion 720 converts a feedback master AC voltage into a feedback master DC voltage and converts a feedback slave AC voltage into a feedback slave DC voltage to feed back them to the protective controller 730. Specially, the feedback portion 720 sequentially outputs a feedback master DC voltage and a feedback slave DC voltage to the protective controller 730.

The protective controller 730 converts an analog DC voltage fed back via the feed back portion 720 into a digital feedback voltage at the initial condition or at the operating condition, and compares the magnitude of the reference voltage with a digital feedback voltage to judge whether there is an error at the initial condition or at the operating condition. When the magnitude of the reference voltage is the same as a digital feedback voltage, the protective controller 730 judges the initial condition or the operating condition as a normal to output an enable signal to the master driver 302 and the slave driver 303. When the magnitudes are different from each other, then the protective controller 730 judges a generation of an error at the initial condition or at the operating condition to output a disable signal to the master driver 302 and the slave driver 303.

Next, a case where the feedback portion 720 is implemented by a fourth feed back method will be described.

The feedback portion 720 drops a master AC voltage fed back from the master trans 207 and drops a slave AC voltage fed back from the slave trans 208 at the initial condition or at the operating condition, and then converts an analog AC voltage generated by a phase difference between the fed back master AC voltage and the slave AC voltage into an analog DC voltage to output it to the protective controller 730. Herein, when there is no phase difference between the fed back master AC voltage and the slave AC voltage, the feedback portion 720 outputs substantially 0V to the protective controller 730 because the fed back master AC voltage and the slave AC voltage have an inverse phase relation.

The protective controller 730 converts an analog DC voltage fed back via the feed back portion 720 into a digital AC voltage at the initial condition or at the operating condition, and compares the magnitude of the reference voltage with a digital AC voltage to judge whether there is an error at the initial condition or at the operating condition. When the magnitude of the reference voltage is the same as a digital feedback voltage, the protective controller 730 judges the initial condition or the operating condition as a normal to output an enable signal to the master driver 302 and the slave driver 303. When the magnitudes are different from each other, then the protective controller 730 judges a generation of an error at the initial condition or at the operating condition to output a disable signal to the master driver 302 and the slave driver 303.

The protective controller 730 may be implemented in such a manner to compare a magnitude an analog DC voltage and the reference voltage fed back via the feedback portion 720 to thereby judge whether there is an error at the initial condition or at the operating condition. In this case, the protective controller 730 does not carry out a process in which the fed back analog DC voltage is converted into a digital voltage.

As described above, the present invention detects an initial driving error using the fed back master AC voltage and the slave AC voltage. According to the principles of the present invention, any one of the fed back master AC voltage and the slave AC voltage may be used to detect an initial driving error.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight driving apparatus of a liquid crystal display (LCD) apparatus including a master trans and a slave trans for supplying a current to a plurality of lamps, and a master driver and a slave driver for driving the lamps, the backlight driving apparatus comprising:

an operated condition unit that converts an AC voltage generated in accordance with a phase difference between a master AC voltage and a slave AC voltage fed back from the master trans and the slave trans, respectively, into an analog DC voltage;

a protect controller that determines an error is generated during an operation of the lamps using the analog DC voltage and outputs an operating error signal when an error is generated; and a lamp driving controller that stops driving the master driver and the slave driver in response to the operating error signal.

2. The backlight driving apparatus as claimed in claim 1, wherein said operation condition unit includes:

a first master voltage splitter for lowering and feeding back the master AC voltage outputted from the master trans;

a first slave voltage splitter for lowering and feeding back the slave AC voltage outputted from the slave trans; and an operated condition detector for converting an AC voltage generated in accordance with a phase difference between the fed back master AC voltage and the slave AC voltage into the analog DC voltage to output it to the protective controller.

3. The backlight driving apparatus as claimed in claim 2, wherein said protective controller converts the analog AC voltage into a digital feedback voltage, and compares a magnitude of a reference operating voltage with the digital feedback voltage to determine whether there is an error at an operating condition.

4. The backlight driving apparatus as claimed in claim 3, wherein when a magnitude of the reference operating voltage is the same as a magnitude of the digital feedback voltage, the protective controller determines that the operating condition is normal and outputs an enable signal to the lamp driving controller.

5. The backlight driving apparatus as claimed in claim 3, wherein when the magnitudes are different from each other, then the protective controller determines that an error is generated during an operation of the lamps and outputs the operating error signal to the lamp driving controller.

6. The backlight driving apparatus as claimed in claim 1, further including:

a voltage feedback means for converting a master AC voltage fed back from the master trans into a master DC voltage and for converting a slave AC voltage fed back from the slave trans into a slave DC voltage to output them to the protective controller, and wherein said protective controller determines that there is an initial driving error using the master AC voltage and the slave DC voltage, and wherein said lamp driving controller controls the master driver and the slave driver in accordance with the determination of the protective controller.

7. The backlight driving apparatus as claimed in claim 6, wherein said voltage feedback means includes:

a second master voltage splitter for lower and feeding back the master AC voltage outputted from the master trans;

a second slave voltage splitter for lower and feeding back the slave AC voltage outputted from the slave trans;

a master AC/DC converter for converting a master AC voltage fed back via the second master voltage splitter into the master DC voltage to output it to the protective controller; and a master AC/DC converter for converting a master AC voltage fed back via the second master voltage splitter into the master DC voltage to output it to the protective controller.

8. The backlight driving apparatus as claimed in claim 7, wherein said protective controller converts the fed back master DC voltage and the slave DC voltage into first and second digital feedback voltages, and compares a magnitude of the reference initial voltage with a magnitude of the first and second digital feedback voltages to determine whether there is an initial driving error.

9. The backlight driving apparatus as claimed in claim 8, wherein when the magnitude of the reference initial voltage is the same as the magnitude of the first and second digital feedback voltages, the protective controller determines that an initial driving condition is normal and outputs an enable signal to the lamp driving controller.

10. The backlight driving apparatus as claimed in claim 8, wherein when the magnitudes are different from each other, then the protective controller determines that there is an initial driving error and outputs an initial error signal to the lamp driving controller.

11. The backlight driving apparatus as claimed in claim 10, wherein said lamp driving controller stops initial driving of the master driver and the slave driver in response to the initial error signal.

12. The backlight driving apparatus as claimed in claim 1, wherein said protective controller and the lamp driving controller are implemented in a single chip.

* * * * *